United States Patent
Osborne et al.

(10) Patent No.: US 6,827,802 B2
(45) Date of Patent: Dec. 7, 2004

(54) OPTICAL RECORDING HEAD HAVING A SOLID IMMERSION LENS

(75) Inventors: John R. Osborne, Saratoga, CA (US); Hong Li, Pleasanton, CA (US); John Berg, Bellingham, MA (US); David Kindler, Concord, MA (US)

(73) Assignee: TeraStar Corporation, Milpitas, CA (US)

(*) Notice: Subject to any disclaimer, the term of this patent is extended or adjusted under 35 U.S.C. 154(b) by 198 days.

(21) Appl. No.: 10/176,283

(22) Filed: Jun. 18, 2002

(65) Prior Publication Data

US 2002/0158353 A1 Oct. 31, 2002

Related U.S. Application Data

(62) Division of application No. 09/292,762, filed on Apr. 14, 1999, now Pat. No. 6,407,884.
(60) Provisional application No. 60/083,349, filed on Apr. 28, 1998.

(51) Int. Cl.[7] ............................. G11B 5/17; G11B 11/03; G11B 21/21
(52) U.S. Cl. ..................... 156/154; 156/293; 156/298; 359/900; 369/300
(58) Field of Search .................... 156/60, 153, 154, 156/293, 298, 250; 369/112.01, 112.23, 300; 359/664, 808, 819, 708, 900

(56) References Cited

U.S. PATENT DOCUMENTS

| | | |
|---|---|---|
| 5,004,307 A | 4/1991 | Kino et al. |
| 5,105,408 A | 4/1992 | Lee et al. |
| 5,121,256 A | 6/1992 | Corle et al. |
| 5,124,961 A | 6/1992 | Yamaguchi et al. |
| 5,125,750 A | 6/1992 | Corle et al. |
| 5,831,797 A | 11/1998 | Schaenzer et al. |
| 5,881,042 A | 3/1999 | Knight |
| 6,270,696 B1 * | 8/2001 | Jain et al. .................... 264/1.1 |
| 6,507,446 B2 * | 1/2003 | Yamashita et al. .......... 359/811 |

FOREIGN PATENT DOCUMENTS

JP    2001221903 A  *  8/2001  ............ G02B/3/00

* cited by examiner

*Primary Examiner*—Jeff H. Aftergut
*Assistant Examiner*—John T. Haran
(74) *Attorney, Agent, or Firm*—Fish & Richardson P.C.

(57) ABSTRACT

An optical recording head is provided which includes a slider body having a leading edge. A void is formed in the slider body to receive a sphere of optically transparent material. The sphere is inserted into the void such that a portion of the sphere protrudes from the slider body. The protruding portion is lapped to be coplanar with a surface of the slider body to form a near-field lens. A mesa may be formed onto the lapped portion and may include a coil. The slider body, mesa, near-field lens, and coil may be formed in one batch process.

10 Claims, 9 Drawing Sheets

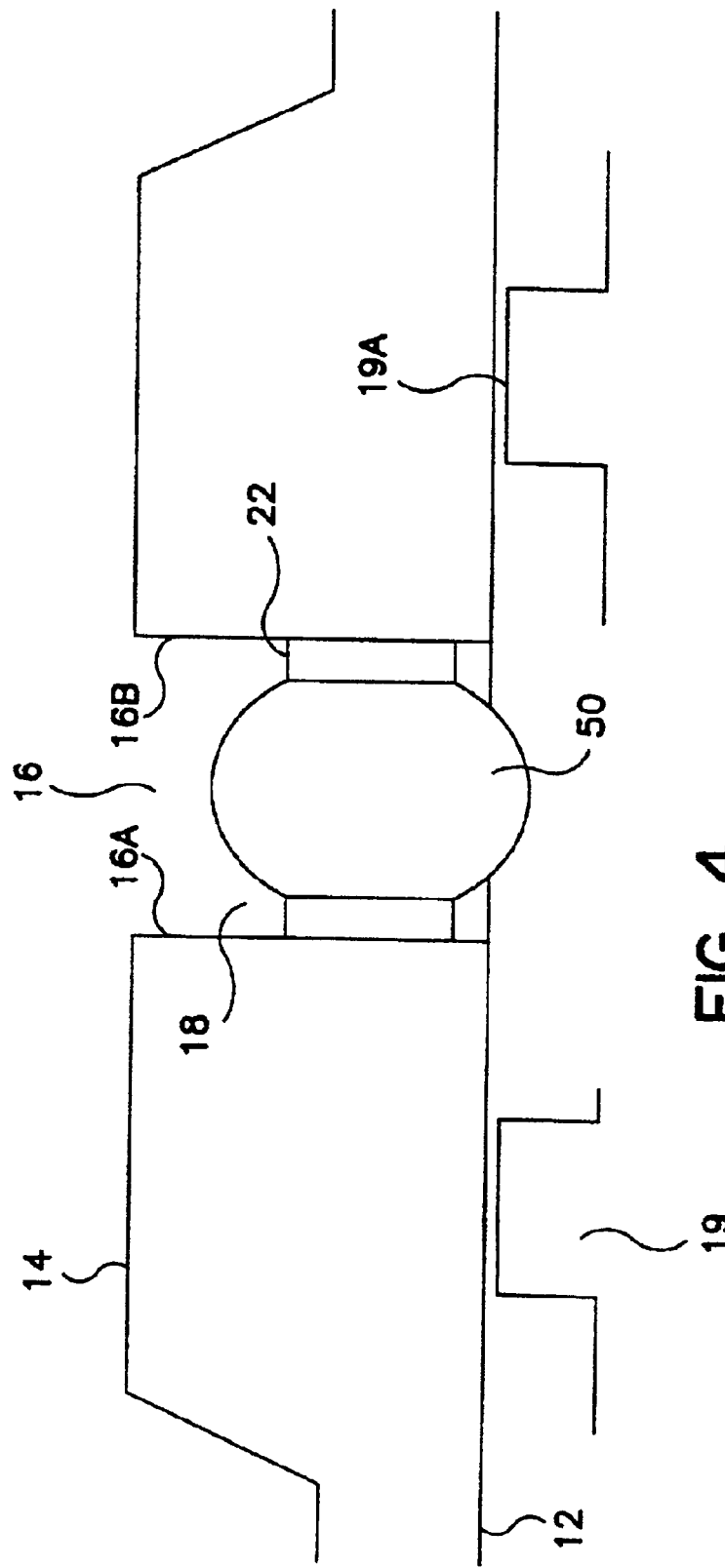

| TURN NUMBER | TURN WIDTH ($\mu m$) | TURN LENGTH ($\mu m$) |
|---|---|---|
| 1 | 3.00 | 238.0 |
| 2 | 3.29 | 260.9 |
| 3 | 3.60 | 285.7 |
| 4 | 3.94 | 312.5 |
| 5 | 4.31 | 341.6 |
| 6 | 4.70 | 373.0 |
| 7 | 5.13 | 407.0 |
| 8 | 5.59 | 443.9 |
| 9 | 6.10 | 483.7 |
| 10 | 6.64 | 526.9 |
| 11 | 7.23 | 573.6 |
| 12 | 7.87 | 624.2 |
| 13 | 8.56 | 678.9 |
| 14 | 9.30 | 738.2 |
| 15 | 10.11 | 802.3 |

| TURN NUMBER | WIDTH OF TOP LAYER (μm) | WIDTH OF BOTTOM LAYER (μm) |
|---|---|---|
| 1 | 6.0 | 6.0 |
| 2 | 5.5 | 5.5 |
| 3 | 5.0 | 5.0 |
| 4 | 4.5 | 4.5 |
| 5 | 4.5 | 4.5 |
| 6 | 4.25 | 4.25 |
| 7 | 4.6 | 4.6 |
| 8 | 5.15 | 5.05 |
| 9 | 5.55 | 5.45 |
| 10 | 6.05 | 5.95 |
| 11 | 6.55 | 6.45 |
| 12 | 7.15 | 6.95 |
| 13 | 7.65 | 7.55 |
| 14 | 8.35 | 8.15 |

OPTICAL RECORDING HEAD HAVING A SOLID IMMERSION LENS

This application is a divisional of U.S. application Ser. No. 09/292,762 filed Apr. 14, 1999 now U.S. Pat. No. 6,407,884, which claims the benefit of U.S. Provisional Application No. 60/083,349 filed on Apr. 28, 1998. The disclosures of the above applications are incorporated herein by reference as part of this application.

BACKGROUND OF THE INVENTION

The present invention generally relates to a recording head for an optical storage system, and more particularly, to a recording head employing a solid immersion lens and a method for forming such a recording head.

Optical data storage systems are known. These systems store a high density of information onto an optical recording medium such as an optical disc.

Generally, in optical recording systems employing an optical head, a light source is used to read and write information to/from the optical recording medium. Data is accessed by focusing the beam of light onto one of the data layers of the disc, and then detecting the reflected light beam. The light beam may be focused onto one of the data layers of the optical recording medium by a lens spaced from the medium.

The data density in optical disc drives is determined in part by the diameter of the focussed beam of light on the disc surface, i.e., the spot diameter. The spot diameter may be reduced in order to increase the data density of the optical storage medium. Several methods are known to decrease the spot diameter. One technique is to use light having a shorter wavelength, for example, in the blue region.

Another technique is to increase the effective numerical aperture ("NA") of the lens configured in the optical head. One approach to achieving a high NA lens is to use a lens of high index of refraction ($\eta$) material. The lens may be positioned in close proximity to one of the data recording layers on the disc surface. One such lens is a near-field lens, for example, a high refractive index lens with a flat bottom portion, e.g., a solid immersion lens ("SIL"). In a SIL system, the optical recording medium is spaced from the base of the SIL by a distance of less than one wavelength of the light that is used. This forms a near-field configuration in which the light is coupled by evanescent coupling. The SIL may have the shape of a hemisphere or a supersphere. An air gap typically separates the solid immersion lens and the disc surface. A hemispherical SIL includes a flat portion and a hemispherical portion. For a super-hemispherical lens, the thickness may be less than or about $r+r/\eta$, where r is the radius of the partial spherical section. Further details of a hemispherical or super-hemispherical SIL lens may be found in co-pending and commonly owned and assigned U.S. patent application Ser. No. 08/026,907.

A slider can be coupled to the head. The slider may include an air-bearing surface for lifting the slider above the optical disc surface. As the optical recording medium spins, air flows under the air-bearing surface to raise the slider relative to the optical disc surface during read and write operations.

One conventional way of forming an optical head having a SIL is as follows. A sphere of optically transparent material is cut to form a cap lens having a spherical portion and a flat portion. The height of the cap lens may be less than the radius of the original sphere. The flat portion of the cap lens is then positioned into a partial cavity formed in a slider body. Next, the cap lens is secured in the partial cavity by a glue bond formed between the flat portion of the cap lens and the slider body. The slider body and the cap lens may then form a hemispherical SIL. A super-hemispherical lens may also be used, as discussed above. In both configurations, the optical light path includes the SIL, the glue bond, and the slider body.

The above system has certain drawbacks. One drawback is that the material which forms the glue bond may have different optical characteristics than the material of the slider body and the SIL. The phase of the light entering through the spherical surface of the SIL can tend to distort at the glue bond surface because the bond material has a different index of refraction than the slider body and SIL. This causes aberrations in the focussed spot in the optical recording medium, and thus, may reduce the performance of the head. The glue bond may also adversely effect the resolution of the spot diameter. Further, this may result in faulty read and write operations between the optical head and the recording medium.

Another disadvantage is that the SIL is formed separate from the slider body. This requires additional machining tools and components to form the resulting optical head. This tends to increase the cost and labor needed to form these heads.

A coil may also be included in the optical head. A magnetic field generated in the coil can switch magnetic domains in the optical recording medium during a write operation. Heat is generated in each turn of the coil when it is energized by an applied current. In order to achieve a desired magnetic field, the number of turns must be specified.

However, heat generated by the energized coils can cause head distortion. Also, the outermost turns of the coil may not be sufficient to generate a magnetic field in the coil center because they have an increased resistance and inductance.

SUMMARY OF THE INVENTION

In one aspect, the present invention is directed to an optical head that includes an optical portion that receives and focuses incoming optical radiation. The optical portion may have a bottom surface adapted to face an optical disk. A magnetic coil may be wound on the bottom surface to have a plurality of turns that have different effective perimeters. The magnetic coil may have a varying property for the different turns such that each of the different turns has substantially the same resistance.

In another aspect, the present invention is directed to an optical head that includes an optical portion that receives and focuses incoming optical radiation. The optical portion may have a bottom surface adapted to face an optical disk. A magnetic coil may be wound on the bottom surface, and may have a plurality of turns that have different effective perimeters. The magnetic coil may have a varying property for the different turns such that the different turns have substantially the same temperature.

Implementations of the above aspects include one or more of the following. The optical portion may include a slider body, a void formed in the slider body, and a solid immersion lens. The solid immersion lens may include a processed flat portion and a spherical portion. The solid immersion lens may be positioned in the void to place the processed flat portion coplanar with the bottom surface. A mesa may be optically coupled to a portion of the processed flat portion of the solid immersion lens, and the coil may be wound around the mesa. The optical head may also include a preformed structure to secure sides of the solid immersion lens to side walls of the void. The preformed structure may be formed from an opaque, a transparent, or a colored glass material. A glue bond may be employed to secure sides of the lens to the sidewalls of the void. The slider body may be formed from a material that is different from the material of the solid immersion lens. The slider body may be formed form the same material as a material of the solid immersion lens. The slider body may be formed from a ceramic material or glass. The solid immersion lens may be formed from cubic zirconia, titanium oxide, beta-silicon carbide, or gallium phosphide. The slider body may be formed from aluminum oxide, calcium titanate, magnesium titanate, silicon, carbide, silicon carbide, or alumina-titanium-carbide. The coil may be rectangular, elliptical, circular, or square. The coil may be a planar coil. The optical head may also include an insulation layer configured to contact the mesa.

In a further aspect, the present invention is directed to a method for fabricating a plurality of optical recording heads. The method includes processing a substrate to form a plurality of voids through the substrate. A sphere of optically transparent material may be placed within each of the voids such that a desired portion of each sphere protrudes from the surface of the substrate. The sphere may be secured to side walls of the void. A portion of the desired protruded portion of the sphere may be removed to form a near field lens, and a mesa may be optically coupled to a portion of the near field lens. A coil may be formed around the mesa, and the substrate may be sliced to form a plurality of optical heads.

Implementations of the invention include one or more of the following. The near field lens may be processed to include a flat portion that is substantially coplanar with the substrate surface. The substrate may be processed to form a plurality of slider bodies such that each of said slider bodies includes one of said voids. The sphere may be secured to said void by a preformed structure. The coil may be formed with a plurality of turns having different effective perimeters. Each of the different turns may have substantially the same resistance. Each of said different turns may have substantially the same temperature. The coil may include a plurality of planar layers. A via may be formed proximate to the mesa to form an electrical contact to the coil.

In a further aspect, the present invention is directed to a method for forming an optical head that includes forming an optical portion that receives and focuses optical radiation. The optical portion may have a bottom surface adapted to face an optical disk. A magnetic coil may be wound on the bottom surface to have a plurality of turns that have different effective perimeters. The magnetic coil may have a varying property for the different turns such that the different turns have substantially the same resistance.

In a further aspect, the present invention is directed to a method for forming an optical head that includes forming an optical portion which receives and focuses incoming optical radiation. The optical portion may have a bottom surface adapted to face an optical disk. The magnetic coil may be wound on the bottom surface to have a plurality of turns that have different effective perimeters. The magnetic coil may have a varying property for the different turns such that the different turns have substantially the same temperature.

BRIEF DESCRIPTION OF THE DRAWINGS

FIG. 4 illustrates a second phase of the formation of the optical head of FIG. 1A.

FIG. 9 is a table of values illustrating the variation of the width of the turns of the coil of FIG. 8 in one implementation.

FIG. 10 is a table of values illustrating the variation of the width of the turns of a coil in accordance with another implementation.

DETAILED DESCRIPTION OF THE PREFERRED EMBODIMENTS

The preferred embodiment relates to flying heads for an optical disk recording system. In particular, the optical system includes a head having a slider to read and write data to or from the optical disk. The slider is configured to "fly" (i.e., supported by an air-bearing surface) over the disk surface, and includes various optical components. Data from the optical beam may be read by a light source, for example, a laser beam positioned relative to the optical head.

Figure 1A:
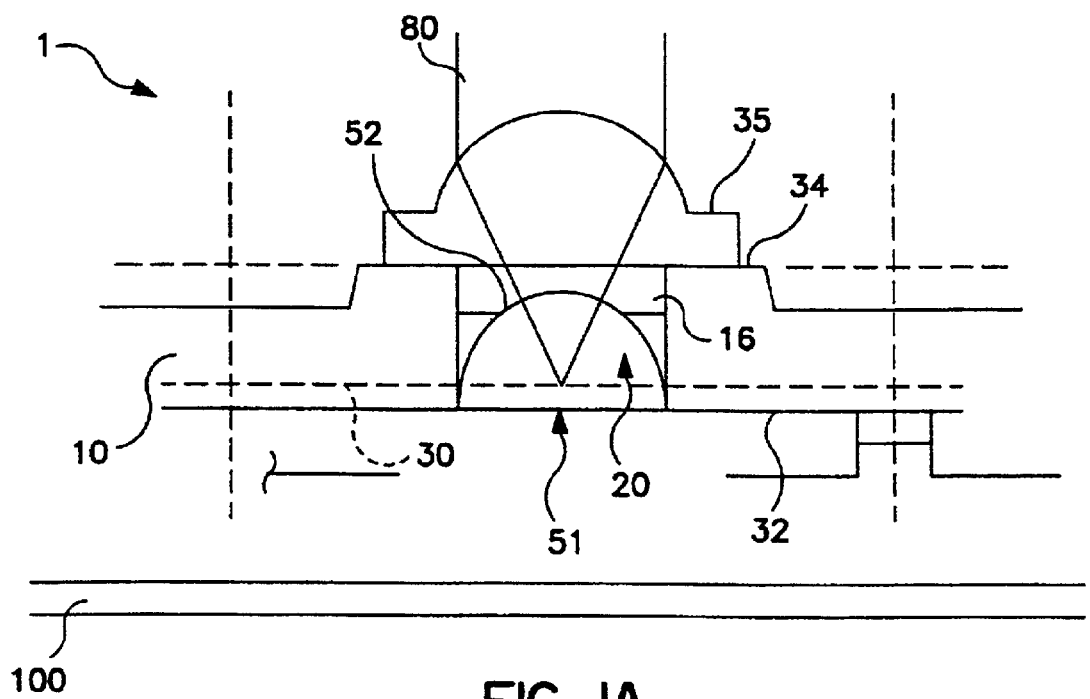
FIG. 1A illustrates one embodiment of an optical recording head.
Figure 1B:
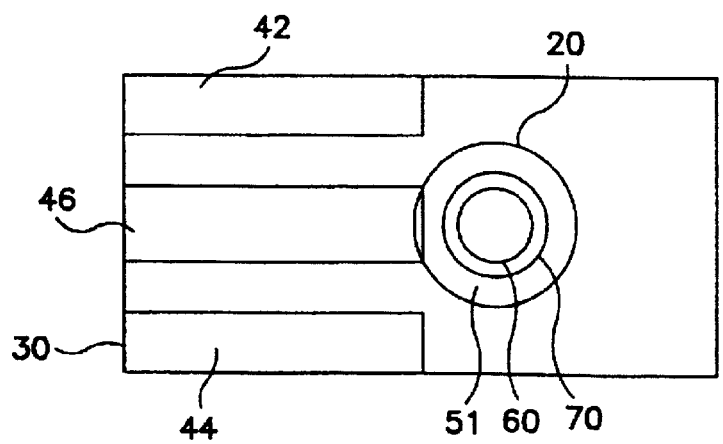
FIG. 1B illustrates a bottom view of the optical recording head of FIG. 1A.
Figure 1C:
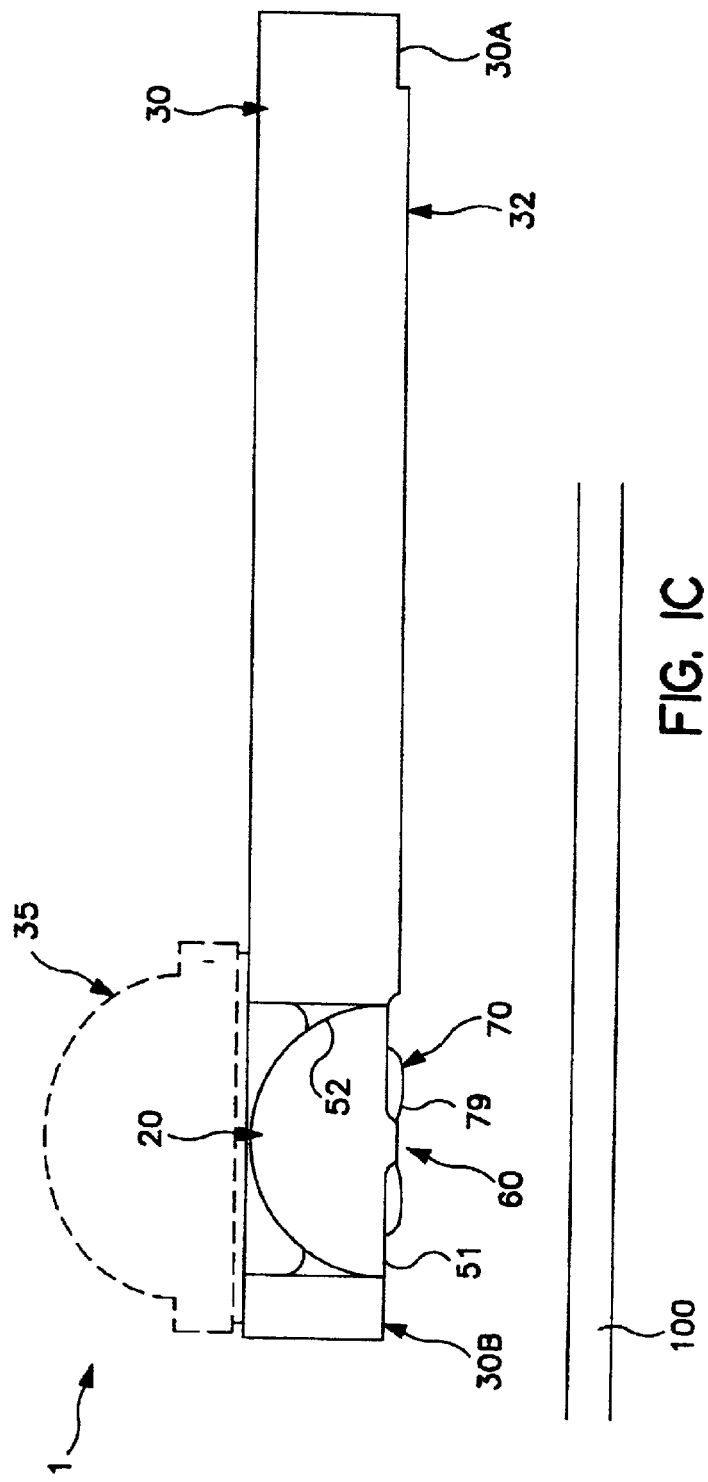
FIG. 1C is a side view of the optical recording head of FIG. 1.

FIG. 1A and FIG. 1C illustrate an optical head 1 as fabricated in accordance with the present embodiment. Optical head 1 may be an optical flying head. Optical head 1 includes an objective lens 35 mounted near a top surface 34 of a slider body 30 formed from a substrate 10. A near-field lens, such as a solid immersion lens (SIL) 20, is formed into a void 16 integral with the slider body 30, and includes a flat portion 51 and a hemispherical portion 52. The flat portion may be generally parallel with the position where an optical disk 100 will be located. Objective lens 35 may also be separated from slider body 30 by a gap. An optical clear path 80 is formed between solid immersion lens 20 and objective lens 35 such that light may be transmitted between SIL 20 and objective lens 35. Optical clear path 80 may be formed from any optically transparent material such as glass, plastic, or air.

FIGS. 1B and 1C show optical head 1 including air-bearing rails 42, 44 and 46 mounted to or formed in a recessed surface 32 of slider body 30. The air-bearing rails 42, 44, and 46 "fly" over the media 100 during the operation of head 1. The slider 30 may include a leading edge 30A and a trailing edge 30B. The leading edge 30A and the trailing edge 30B may be recessed from the surface 32. A mesa-like structure 60 may also be formed on flat portion 51 of lens 20. The term "mesa" refers to an island of optically transparent material formed in or on the flat portion 51 of SIL 20. The optical head 1 may also include a coil 70 formed around the mesa 60 such that it supplies a magnetic field to the optical recording system when a current is applied to a turn of coil 70 during operation.

Figure 7:
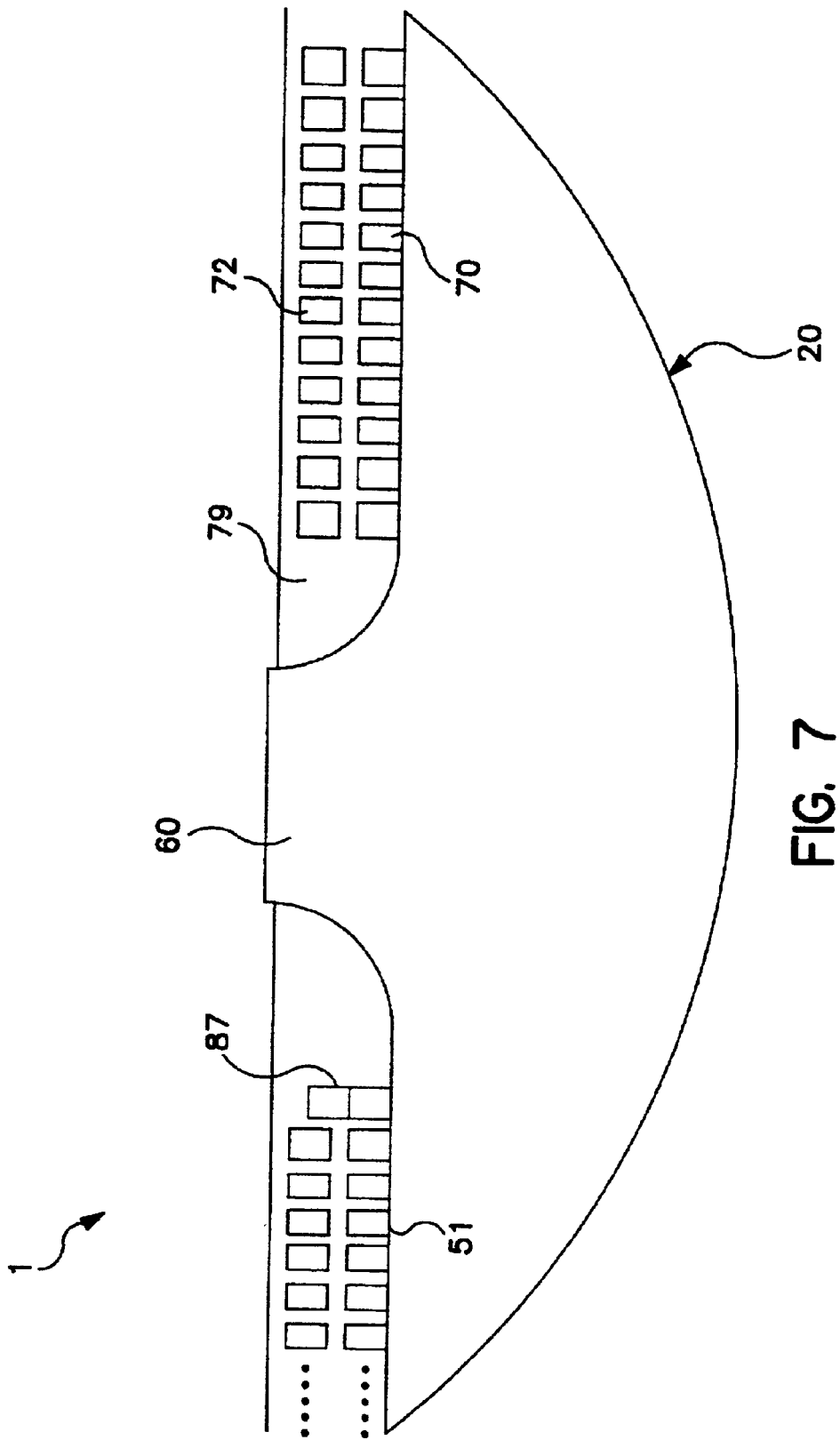
FIG. 7 illustrates a mesa formed onto a portion of a solid immersion lens in accordance with the present invention.

FIGS. 1C and 7 show how the coil 70 may include an insulation layer 79 which contacts mesa 60. The insulation layer 79 (not shown) may cover a portion or all of the coil 70 to protect the coil 70 during operation of optical head 1. Coil 70 may include one or more turns, which form one or more layers. For a multi-layer coil, a via 87 may be formed proximate mesa 60 to form an electrical contact between each of the layers of the coil 70. In one processing regime, the mesa 60 may protrude a distance slightly greater than insulation layer 79 of coil 70.

During operation of optical head 1, converging rays from objective lens 35 enter in the rear spherical portion 52 on or near SIL 20. The beam is then focused on or near the flat portion 51 of SIL 20. As shown in FIG. 1A, an optical medium 100 is typically located less than a wavelength away from the flat portion 51 to form a near field configuration. In this configuration, a plurality of evanescent waves generally extend a distance less than a wavelength from the flat portion before being significantly attenuated. The evanescent waves may couple between the small spot near or on portion 51 and the medium 100. This can result in an increase in the effective numerical aperture. In a hemispherical SIL (e.g., SIL 20), the increased numerical aperture can rise with n. For a superhemispherical SIL, the increased effective numerical aperture can rise with $n^2$.

As discussed above, an applied current passing through known coils generates excessive heat during the operation of the optical head 1. This may result in head distortion and thermal stress in the coil.

One aspect described herein is to minimize the generated heat caused by the applied current passing through the coil. Each turn of the coil may be formed to have substantially the same resistance by varying the effective perimeter of each turn of the coil. Alternatively, each turn of the coil may be formed to have substantially the same temperature by an iterative process, as described below.

Figure 2:
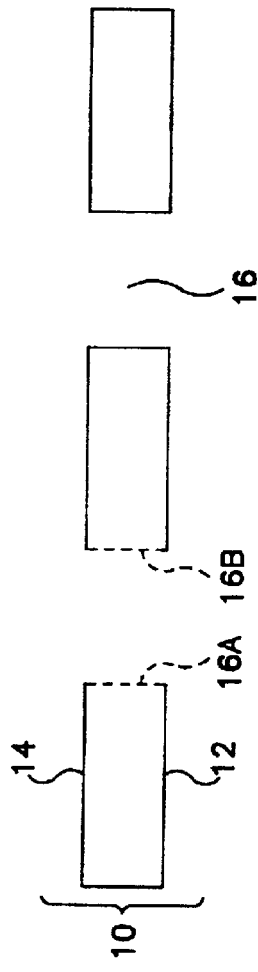
FIG. 2 illustrates a substrate from which the optical head of FIG. 1A is formed.

FIG. 2 shows optical head 1 being fabricated from a substrate 10. As described below, more than one optical head 1 may be formed from substrate 10. Substrate 10 may be formed from a ceramic material. Suitable materials for substrate 10 include aluminum oxide, calcium titanate, magnesium titanate, silicon, carbide, silicon carbide, alumina-titanium-carbide, cubic zirconia, or other similar materials.

Figure 3:
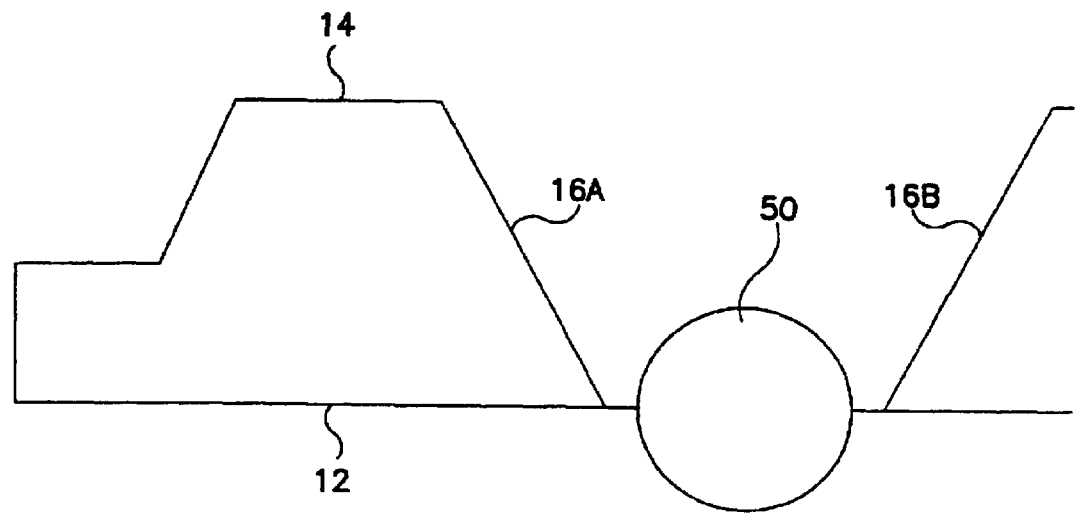
FIG. 3 illustrates a first phase of the formation of the optical head of FIG. 1A.

Substrate 10 includes a top surface 14 and a bottom surface 12. Substrate 10 also includes a plurality of voids 16 formed through the entire thickness of substrate 10. Substrate 10 may have a width of about 15 cm, a thickness of about 10–40 mm, and a length of about 15 cm. Voids 16 may be formed by machining, grinding, laser cutting, jig boring, "green" casting, MEMS techniques, reactive ion etching, or other suitable techniques. Voids 16 may be separated by about one-half the thickness of the substrate or more. Side walls 16A and 16B of void 16 may be formed at an angle relative to substrate 10. (FIG. 3.) Side walls 16A and 16B may also be formed such that they are perpendicular with substrate 10 (FIG. 2).

Substrate 10 may be used to form an array of optical heads 1 in one batch process. The plurality of optical heads 1 formed from single substrate 10 are each exposed to the same fabrication step at the same time during the fabrication process. The resulting plurality of optical heads may then be separated into individual optical heads 1. Each of the optical heads 1 may be separated from substrate 10 by sawing, milling, or other suitable techniques. Each of the optical heads 1 may be processed to include solid immersion lens 20, mesa 60 (FIG. 7), coil 70 (FIG. 8), air-bearing rails 42, 44, and 46 (FIG. 6), and slider body 30. The objective lens 35 may also be formed integral with the SIL 20 in another step of the batch processing. For simplicity, the processing method for fabricating a single optical head 1 will now be described.

Figure 5:
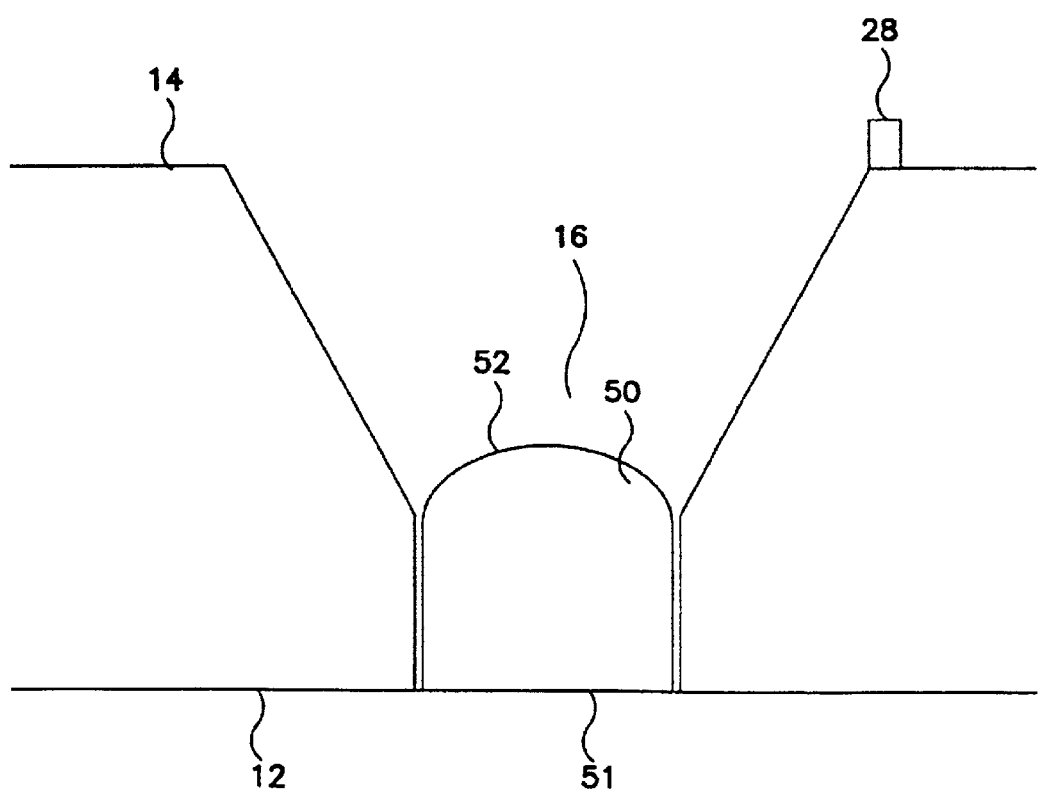
FIG. 5 illustrates a third phase of the formation of the optical head of FIG. 1A.

FIGS. 3–5 show the SIL 20 is formed from a sphere 50 of a transparent material having a high index of refraction. Suitable materials include cubic zirconia, gallium phosphide, titanium oxide, beta-silicon-carbide, LASF 35 glass, SLA 79 glass, or other similar materials.

During the fabrication process of optical head 1, sphere 50 is placed in one of the voids 16. Void 16 defines an opening which has a diameter that is slightly greater than the diameter of sphere 50. Sphere 50 may have a diameter of about 1 mm. As shown in FIG. 3, sphere 50 is positioned in void 16 such that a portion of sphere 50 protrudes from bottom surface 12 of substrate 10. For example, about one-half of the sphere 50 may extend below bottom surface 12. In one fabrication process, the sphere 50 is positioned in void 16 such that the diameter of the sphere 50, and thus the resulting diameter of SIL 20, defines the outermost dimensions of the optical path 80 (FIG. 1A).

In another processing method, bottom surface 12 of substrate 10 may be positioned on a plurality of projections 19 (FIG. 4). Projections 19 are formed such that their top surfaces 19A are coplanar. Sphere 50 is aligned in void 16 such that it may protrude a suitable distance from bottom surface 12 as discussed above. Projections 19 may be cubical, rectangular, or spherical.

FIG. 4 illustrates sphere 50 is inserted into void 16 and forms cavities 18 between the outer edges of sphere 50 and the sidewalls 16A and 16B of void 16. In one processing method, sphere 50 may be secured to walls 16A and 16B by glassing or by adhesive bonding (e.g., glue bonding). In another processing method, a pre-formed glass structure 22 may be used to form an annulus around the sphere 50 and outside the region of the SIL 20 to secure the sphere 50 against sidewalls 16A and 16B. In this method, a precise volume of material may be selected to form the pre-form 22. In one embodiment, the pre-form 22 is formed in void 16 before sphere 50 is inserted into void 16. Alternatively, pre-form 22 may be formed around sphere 50 after the sphere 50 is positioned in void 16. Pre-form 22 may also be used to align and position sphere 50 in void 16. Pre-form 22 may be fabricated by powder-pressing techniques to eliminate voids and gas entrapment. The pre-form 22 may be made from an opaque, transparent, or colored glass material. In this case, the pre-form 22 may operate to minimize the distortion of the transmission of light at the edges of the SIL 20. Pre-form 22 may also be formed from the same material as sphere 50.

In either processing method, the sphere is only secured around its edges, and sidewalls 16A and 16B, as shown in FIG. 4. No bonding joint is formed as part of the optical path 80 defined by the diameter of sphere 50 (see FIG. 4), as described above. Advantageously, the pre-form does not affect the resolution of the spot diameter focussed onto the storage media.

Once sphere 50 is secured inside void 16, substrate 10, sphere 50, and the bonding material (e.g., pre-form 22) are glassed. In this process, substrate 10, sphere 50, and the bonding material are exposed to sufficient heat to melt the bonding material. The material is melted such that it fills the cavities 18 of void 16. Suitable temperatures are between 400E–700EC.

FIG. 5 shows sphere 50 being lapped at bottom surface 12 to form a flat portion 51. Flat portion 51 is constructed such that it is coplanar with bottom surface 12 of substrate 10.

Bottom surface 12 may also be lapped before sphere 50 is secured inside void 16. Bottom surface 12 may also be lapped concurrently with sphere 50. The lapping of sphere 50 and bottom surface 12 may be controlled by inserting a hard material, for example, diamond in a plurality of holes (not shown) surrounding void 16. In this case, deposits of material in the surrounding holes may define the region for the lapping process to occur. Accordingly, the lapping ceases at the points when the material deposits are contacted by the lapping tool.

In one processing method, substrate 10 may be formed with mounts 28. As shown in FIG. 5, mounts 28 may be adhesion points for mounting the objective lens 35. Mounts 28 may be slightly larger in diameter than the diameter of the SIL sphere, and may have a height between 50–125 micrometers. Objective lens 35 may be secured to mounts 28 by epoxies or ultraviolet cured adhesives. Mounts 28 may be secured to top surface 14 before the lapping procedure, as discussed above.

It has been contemplated by the inventors that a plurality of objective lenses 35 may be manufactured in an array as a step of the batch process similar to optical head 1. The resulting objective lenses 35 may then be positioned relative to substrate 10 such that objective lens 35 is mounted relative to SIL 20 to provide an optimal focus for a beam of light passing therethrough. Objective lens 35 may be made from a glass or a plastic such as polycarbonate.

Figure 6:
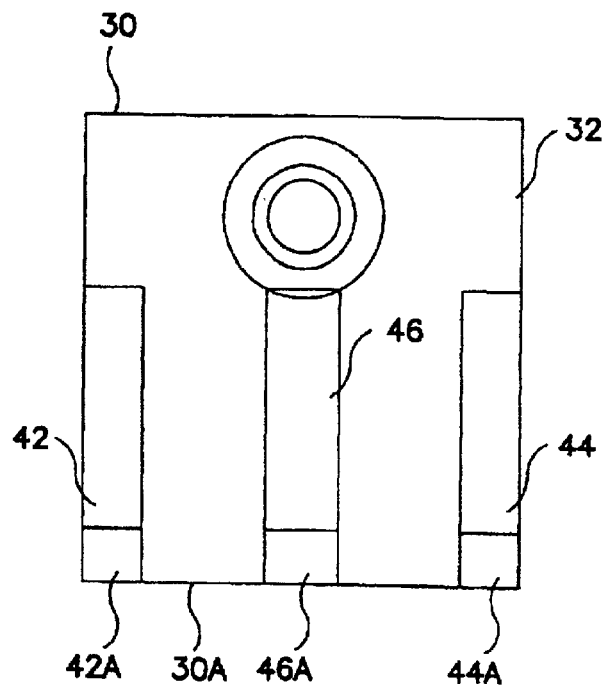
FIG. 6 illustrates bearing rails formed onto the substrate of FIG. 2.

As discussed earlier, an optical head 1, including a slider body 30, may be formed from substrate 10 after the SIL 20 is formed in void 16 during a batch process. Slider body 30 may have a length of about 3 mm and a width of about 2 mm. As shown in FIG. 6, slider body 30 may also include air-bearing rails 42 and 44 mounted to recessed surface 32 of slider body 30. Rails 42 and 44 may be machined, chemically etched, plasma etched, or ion-milled from surface 32. Slider body 30 may also include a center air-bearing rail 46 which is fabricated similarly to rails 42 and 44. Rails 42, 44, and 46 may include a tapered flat edge 42A, 44A, and 46A, respectively. The edges 42A, 44A, and 46A may be lapped into leading edge 30A such that they are coplanar. Rails 42A, 44A and 46A may be formed before the sphere 50 is glassed or at any other stage of the manufacturing process. The slider body 30 may be formed from the same material as SIL 20.

FIG. 7 shows a mesa-like structure 60 formed on a portion of flat portion 51 of SIL 20. For example, mesa 60 may be formed such that its center is aligned with the center of the apex of the spherical portion 52 of the SIL lens 20. The mesa 60 is formed to be coplanar with surface 32 of slider body 30. The coil 70 may include an insulation layer 79 which contacts mesa 60. The insulation layer 79 may cover a portion or all of the coil 70 to protect the coil 70 during operation of optical head 1. Coil 70 may include one or more turns, which form one or more layers. For example, the coil 70 may include two coil layers of eleven turns each. A via 87 may be formed proximate mesa 60 to secure the layers of the two coils together at the inner turns next to the mesa 60. In one processing regime, the mesa 60 may protrude a distance slightly above the insulation layer 79 of coil 70.

Mesa 60 may be formed by techniques such as chemical etching, plasma etching, sputter etching, or ion-milling. Mesa 60 may also be formed by masking and etching in a conventional manner. Mesa 60 may be formed concurrently with rails 42, 44, and 46. Mesa 60 may have a height of about 15–20 micrometers.

Figure 8:
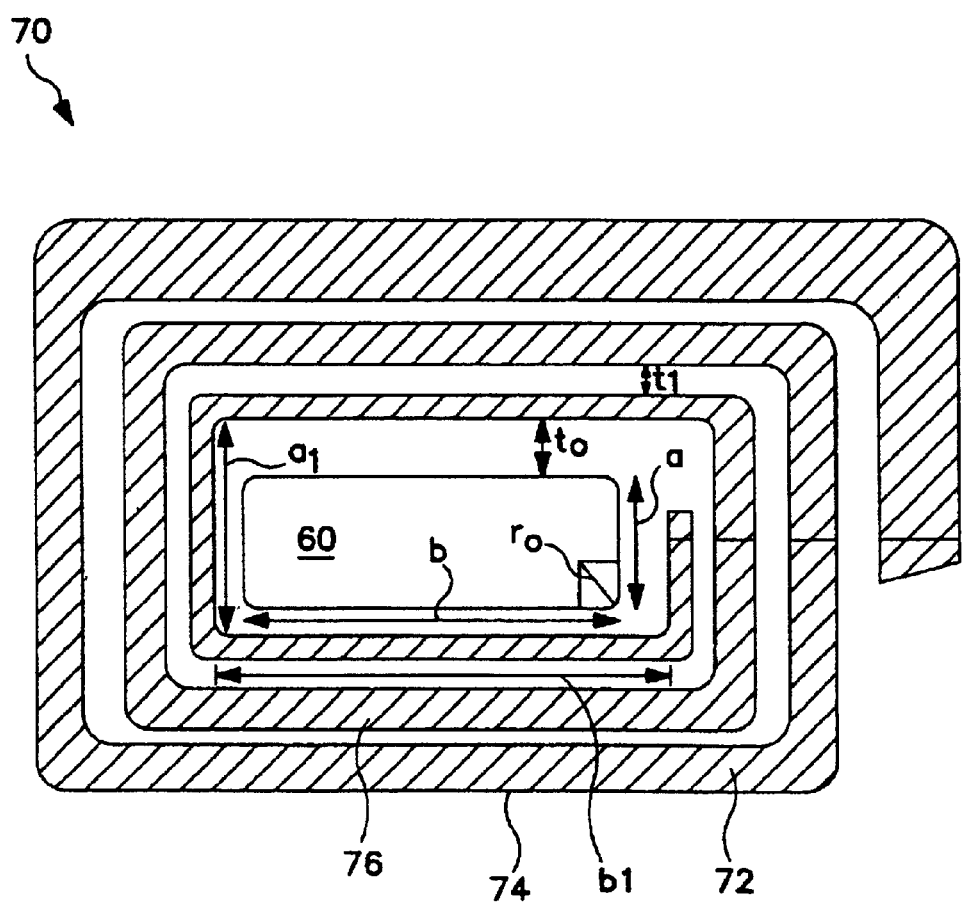
FIG. 8 illustrates one embodiment of a magnetic coil in accordance with the present invention.

FIG. 8 shows a magnetic coil 70 is formed around mesa 60 such that the top surface 72 of coil 70 is slightly below the mesa 60, and surface 32 of slider body 30. Coil 70 may be made from a conductive strip of material such as copper, silver, or gold. Coil 70 may be formed from one or more wire conductive strips of material. Coil 70 may have an insulation layer 79. Coil 70 may be a planar coil structure, or a coil which includes one or more layers. Coil 70 may be disposed around mesa 60 by vacuum deposition. A mask and etch or a mask and selective electroplating process may then be used to complete the coil formation process. If multiple conductive strips are used to form coil 70, each of the strips is preferably insulated except at a portion where the strips are joined. The coil 70 includes a plurality of turns 76. During operation of optical head 1, a current may be supplied to coil 70 to generate heat through each of the turns 76.

The total resistance of the coil may be optimized by varying the cross-sectional area of each turn of the coil proportional to the length of each turn of the coil. This reduces the thermal stress generated in the coil by the applied current. This may be calculated as follows.

Generally, $$R_{TOT} = R_1 + R_2 + R_3 \ldots + R_n \tag{1}$$

where $R_{TOT}$ is the total resistance of coil 70 and $R_1 + R_2 \ldots R_n$ is the resistance of each turn of the coil for $n = 1, 2, 3 \ldots$ The cross-sectional area "A" for each turn of the coil may be calculated as:

$$A = TW_1 \tag{2}$$

where T is the thickness of a turn of the coil and W is the width of the turn. It may be assumed that the thickness for each of the turns of the coil is constant.

Therefore, for each turn, the resistance may be calculated as $$R = \rho L / TW \tag{3}$$

where R is the resistance of the coil, L is the length of the turn of the coil, $\rho$ is the resistivity of the conductive material, and W is the width of the coil. Since the resistance for each turn of the coil is the same (i.e. $R_1 = R_2 = R_3$), the width for a turn $W_{i+1}$ (i=0, 1, 2, . . . n) may be expressed as:

$$W_{i+1} = L_{i+1} / L_1 W_1 \tag{4}$$

where $L_{i+1}$ (i=0, 1, 2, . . . n) is the length of a turn, $L_1$ is the length of the first turn of the coil, and $W_1$ is the width of the first turn of the coil.

FIG. 8 shows mesa 60 having length "b", a width "a", and a corner radius "$r_0$". The distance from the mesa 60 to the first turn of coil 70 may be denoted as "$t_0$". The distance between the first coil and the second coil may be denoted as "$t_1$". For the first turn of coil 70, the corner radius "$r_1$" may be calculated as follows:

$$r_1 = r_0 + t_0 + W_1/2 \tag{5}$$

The length $L_1$ of the first turn of the coil may be calculated by:

$$L_1 = 2(b - 2r_0) + 2(a - 2r_0) + 2\pi r_1 \tag{6}$$

For the ith turn of coil 70, the corner radius "$r_i$" may be calculated as follows.

$$r_i = r_0 + t_0 + (W_1 + W_2 + \ldots + W_{i-1}) + t_1 + t_2 + \ldots + t_{i-1} + Wi/2 \, (i=1, 2, \ldots n) \tag{7}$$

where $t_i$ (i=1, 2, ... n−1) is the insulator width between the ith turn and the (i+1)th turn and $W_i$ (i=1, 2, ... n) is the width of the ith turn.

FIG. 9 shows an example calculation to calculate the width of individual turns of the coil 70. In this example, the mesa had a length (b) of 72.5 μm, a width (a) of 42.1 μm, a mesa to the first coil distance ($t_0$) of 6.0 μm, a distance between the first coil and the second coil ($t_1$) of 1 μm, and a corner radius ($r_0$) of 9.15 μm. Using equations 5, 6, 7, and 8, the length of each turn of the coil may be used to determine the width for each turn of the coil for a constant resistance (i.e., R α L/W).

The length of the ith turn $L_i$ (i=1, 2, ... n) for a coil having a constant resistance for each turn may be calculated as:

$$L_i = 2(b+a) - 8r_0 + 2\pi r_i \qquad (8)$$

The total resistance $R_{TOT}$ of coil 70 may range between 10–30 ohms.

As discussed above, a coil having substantially the same temperature for each turn of the coil may be designed by an iterative process. In this operating regime, a larger amount of current may be supplied to the coil without burning turns of the coil. Similar to the above coil, this coil configuration minimizes the thermal stress on the coil. This also increases the magnetic field strength at the disk surface.

Initially, a coil configuration is employed to determine the temperature distribution in the area of mesa 60 covered by the coil. A conventional coil design or the above coil with a constant resistance for each turn may be used as the initial coil configuration. Then, the resistance of a turn of the coil is varied to locate a substantially uniform temperature distribution for the coil. The resultant temperature distribution of the modified coil is then evaluated to determine temperature variations of each turn of the coil from a predetermined temperature. The above process is repeated until the temperature distribution across the mesa surface covered by the coil is less than a desired tolerance limit. A computer design program may be implemented to calculate the optimal width for each turn of the coil or a trial and error technique could be used.

FIG. 10 shows an exemplary design of the width of individual turns of a constant temperature coil having two layers stacked over each other. In this configuration, the mesa had a length (b) of 37 μm, a width (a) of 71 μm, and a corner radius ($r_0$) of 5 μm. As seen in FIG. 10, the width of the first turn of the top and bottom layers was 6 μm. For turns 2–5, the width of the turn decreased to about 4.5 μm. For the outermost turns (i.e., turns 8–14), the width was increased to about 8.35 μm. As a result, the temperature was maintained at about 78EC for each turn of the coil. Thus, by varying the width of each turn of a coil, the temperature for each turn may be kept substantially the same.

Although only a few embodiments have been disclosed in detail above, those of ordinary skill in the art should certainly understand that modifications are possible in the preferred embodiments without departing from the teachings hereof. All predictable modifications are intended to be included. For example, there are other ways of modifying resistance. A first way changes a property of the material rather than its width. For example, a metallic alloy could be used in which the composition of the alloy varies along its length.

What is claimed is:

1. A method for fabricating a plurality of optical heads, comprising:
   processing a substrate to form a plurality of voids through the substrate;
   placing a sphere of optically transparent material within each of said voids such that a desired portion of each said sphere protrudes from a surface of said substrate;
   securing each said sphere to sidewalls of each said voids;
   removing at least a portion of said desired protruded portion of each sphere to form a near-field lens;
   forming a mesa optically coupled to a portion of said near field lens;
   forming a coil around said mesa; and
   slicing said substrate to form said plurality of optical heads.

2. The method of claim 1, wherein said removing step comprises processing said near-field lens to include a flat portion that is substantially coplanar with said substrate surface.

3. The method of claim 1, wherein the processing step comprises processing said substrate to form a plurality of slider bodies, each of said slider bodies including one of said voids.

4. The method of claim 1, wherein said placing step further comprises securing said sphere to said void by a preformed structure.

5. The method of claim 1, wherein said placing step further comprises securing said sphere to said void by a glue bond.

6. The method of claim 1, wherein said coil is formed with a plurality of turns having different effective perimeters, and each of said different turns having substantially the same resistance.

7. The method of claim 1, wherein said coil is formed with a plurality of turns having different effective perimeters, and each of said different turns having the same temperature.

8. The method of claim 1, wherein said coil comprises a plurality of planar layers.

9. The method of claim 1, wherein said forming of said mesa comprises forming a via proximate said mesa to form an electrical contact to said coil.

10. The method of claim 1, further comprising forming an insulation layer configured to contact said mesa.

* * * * *

UNITED STATES PATENT AND TRADEMARK OFFICE
CERTIFICATE OF CORRECTION

PATENT NO. : 6,827,802 B2
DATED : December 7, 2004
INVENTOR(S) : John R. Osborne et al.

It is certified that error appears in the above-identified patent and that said Letters Patent is hereby corrected as shown below:

Title page,
Item [73], Assignee, please delete "TeraStar" and add -- TeraStor --.

Signed and Sealed this

Seventeenth Day of May, 2005

JON W. DUDAS
*Director of the United States Patent and Trademark Office*